2,872,442

PURIFICATION PROCESS

Virgil V. Bogert, Garden City, N. Y., assignor to Chas. Pfizer & Co., New York, N. Y., a corporation of Delaware No Drawing. Application November 27, 1957
Serial No. 699,172

4 Claims. (Cl. 260—210)

This application is concerned with a process for purifying streptomycin and dihydrostreptomycin or mixtures of these. More particularly, it is concerned with a process for removing streptidine from mixtures containing it together with streptomycin and/or dihydrostreptomycin.

Streptomycin and dihydrostreptomycin are well known antibiotics whose efficacy has been attested by numerous articles in the chemical and medical literature. Streptomycin is produced by fermentation using an organism of the genus Streptomyces griseus and dihydrostreptomycin is produced by catalytic reduction of streptomycin.

Both streptomycin and dihydrostreptomycin, unless especially careful purification procedures are used, are generally found associated with streptidine—an undesirable impurity. The streptidine, which is apparently formed during the fermentation, is so similar in chemical and physical characteristics to streptomycin that small quantities of it generally elude the usual purification procedures. Streptidine is also carried through the reduction process by which dihydrostreptomycin is produced and again escapes the purification techniques.

For many of the uses and in many of the dosage forms of streptomycin and dihydrostreptomycin generally in use, the presence of small amounts of streptidine has not been found to be particularly detrimental. In one very important instance, however, the presence of streptidine has been the cause of particularly difficult problems. Both streptomycin and the reduced form dihydrostreptomycin are often marketed in the form of soluble sulfate salts when the compounds are to be used in injectable dosage forms. In these solutions, the presence of as little as 0.5% or even less of streptidine causes precipitation of streptidine sulfate after the solution has been stored for any appreciable length of time. The resulting turbidity greatly detracts from the salability of the product. It can also lead to difficult problems relative to clogging of the needle by precipitated particles. Prior to the discovery of the process of the present invention, this precipitation was indeed a serious problem and one that drained off a great deal of research time, effort and expenditure. It is apparent then that any process which makes possible the preparation of streptomycin or dihydrostreptomycin injectable solutions free from precipitation problems meets a long felt need in the art.

It has now been found that it is possible to remove streptidine from admixture with streptomycin and/or dihydrostreptomycin by a process utilizing aromatic nitrophenols particularly dihalogenated nitrophenols as streptidine precipitating reagents. This is a most unusual discovery particularly since the disclosure and claims of United States Patent No. 2,779,759, issued January 29, 1957, to Yabuta and Ikeda, describe and claim a process for obtaining purified streptomycin by the addition of an alkali salt of a halogenated phenol containing at least four halogen atoms to impure streptomycin to precipitate streptomycin polyhalophenolate from which the streptomycin can be regenerated. In the process of the instant invention, the precipitating agent precipitates not the streptomycin but the streptidine.

In its most general terms the process of this invention consists in precipitating a streptidine dihalogenonitrophenolate from an aqueous solution containing it as an impurity in admixture with streptomycin and/or dihydrostreptomycin at a pH of from about 5.8 to about 10.5. The streptidine dihalgenonitrophenolate is removed, for example, by filtration or centrifugation to leave a streptidine free solution of anitbiotic. The process is capable of completely removing streptidine from antibiotic mixtures in which it is present at concentrations as low as 0.5% by weight or even lower.

Streptomycin and dihydrostreptomycin which have been purified using the process of this invention have been converted to sulfate salts and dissolved in water. These samples have been stored for periods as long as 20 weeks and no streptidine sulfate has precipitated. Other samples of streptomycin sulfate and dihydrostreptomycin sulfate identically prepared except that the treatment with the precipitating agent was omitted have all precipitated streptidine sulfate when stored for as few as five weeks.

In the specific performance of the process of this invention, the selected dihalogenonitrophenol is added to the aqueous antibiotic containing solution, the pH of the latter being from about 5.8 to about 10.5. The solution is agitated for a period from about 4 to about 200 hours during which time the streptidine dihalogenonitrophenolate precipitates and can be removed.

It is obvious that a quantity of a precipitant at least equivalent to the quantity of streptidine present should be added if there is to be any hope of precipitating all of the streptidine. It is conceivable of course that there may be conditions in which extremely small quantities of streptidine would not be undesirable and in these instances, less than an equivalent of a dihalogenated nitrophenol will be added. These, however, would be unusual cases and in most instances it will be desirable to effect complete precipitation by utilizing an excess, even up to a 1000% excess or even more, of the purifying reagent. There is no objection to so doing since any nitrophenol which does not react with streptidine is readily removed. It can be removed, for example, by simply acidifying the filtrate from which the streptidine sulfate has been removed to precipitate the dihalogenated nitrophenol and then passing the filtrate over a charcoal column at a pH of about 7. The optimum pH at which to precipitate a particular nitrophenol will vary from one to the other but in most instances a pH of 2.5 or lower will be found to be sufficient.

The most desirable pH at which to precipitate streptidine sulfate depends upon a number of factors. It should be high enough to dissolve at least a portion of the dihalogenated nitrophenol and yet not so high as to subject the antibiotic to the danger of decomposition.

In general, a pH range of from 5.8 to 10.5 is satisfactory. Usually, however, precipitation from a streptomycin solution will take place at a pH below 7.5 and from a dihydrostreptomycin solution precipitation will take place below 8.5. If the solutions are maintained at pH's above these maxima the antibiotic slowly decomposes. The preferred pH range which can be used for either streptomycin, dihydrostreptomycin or a mixture of the two is from about 6.5 to about 7.5.

The desired pH can be generated in situ, that is the precipitant and the antibiotic can be mixed and sufficient alkaline reagent added thereto to bring the pH to the desired point. Alternatively, the phenol can be dissolved in alkaline reagent and the resulting solution added to the antibiotic containing solution. Any of the usual alkaline reagents are suitable for adjusting the pH.

These include the alkaline earth metal and alkali metal oxides, hydroxides, carbonates, bicarbonates and other obvious equivalents. Sodium hydroxide is especially suitable because it is readily available and relatively inexpensive.

Organic nitrogenous bases including primary, secondary and tertiary amines can also be advantageously employed. Triethylamine is especially useful because it is infinitely soluble in water.

The temperature at which the precipitation is carried out is in no way critical. A temperature of from about 5° C. to about 70° C. is entirely satisfactory. As might be expected, it is most convenient to carry out the reaction at room temperature, that is, from about 20° to about 30° C.

The time required to precipitate a streptidine dihalogenonitrophenolate varies with the amount to be precipitated and with the principal antibiotic. Thus, if the mixture contains only streptomycin and streptidine, the mixture should be agitated for a period from about 24 to about 200 hours to assure as complete a precipitation as possible. On the other hand, when dihydrostreptomycin is the principal component of the mixture, an agitation period of from about 4 to about 24 hours is usually sufficient. With mixtures intermediate times can be used. It has been found that in most instances, very efficient purification can be effected if the agitation period is about 36 hours.

The dihalogenate nitrophenols which it is specifically intended to include within the purview of the instant invention include the 2,6-dihalogenated 4-nitrophenols, namely 2,6-dibromo-4-nitrophenol, 2,6-difluoro-4-nitrophenol, 2,6-dichloro-4-nitrophenol and 2,6-diiodo-4-nitrophenol. These compounds have been found to be especially useful since they are effective in precipitating streptidine from mixtures having a low level of antibiotic activity as well as those with a high level. They are effective with solutions containing as little as 5000 $\gamma$/ml. of antibiotic activity or even less, and they can also be profitably utilized with solutions as concentrated as those containing 400,000 $\gamma$/ml. of antibiotic activity. These solutions can contain as little as 2000 $\gamma$/ml. of streptidine or even less. They are operative when their own concentration in the mixture to be purified is as little as 1% or even less, and it is rarely necessary to utilize concentrations higher than 5% to precipitate substantially all of the streptidine present. They are readily recovered from the solution in accordance with the procedure described above. They can also be readily regenerated from the streptidine precipitate by simple hydrolysis procedures known to those skilled in the art. Furthermore, they form the precipitate within an economically practical period of time and the precipitate is a crystalline one which can be readily removed. The compounds themselves can be prepared in accordance with procedures well known to those skilled in the art.

The assay procedure used to determine the concentration of streptidine, streptomycin and dihydrostreptomycin is that described by Monastero in the Journal of the American Pharmaceutical Association, Scientific Edition, vol. 41, pages 322 to 324.

The following examples are given solely for the purpose of illustration and are not to be construed as limitations of this invention, many apparent variations of which are possible without departing from the spirit or scope thereof.

EXAMPLE I

*Preparation of stock solutions*

Stock solutions of 2,6-difluoro-, 2,6-dichloro-, 2,6-dibromo-, and 2,6-diiodo-4-nitrophenol were prepared by dissolving 1 g. of the phenol in 10 ml. of water and adjusting the pH to 8.0. These are referred to below as samples A, B, C and D respectively.

EXAMPLE II

*Antibiotic containing samples*

Aqueous samples were prepared containing streptidine and streptomycin (sample I), streptidine and dihydrostreptomycin (sample II) and streptidine, streptomycin and dihydrostreptomycin (sample III). Sample I contained approximately 10,000 $\gamma$/ml. of streptidine and 400,000 $\gamma$/ml. of streptomycin. Sample II contained approximately 10,000 $\gamma$/ml. of streptidine and 400,000 $\gamma$/ml. of dihydrostreptomycin. Sample III contained approximately 10,000 $\gamma$/ml. of streptidine, 200,000 $\gamma$/ml. of streptomycin and 200,000 $\gamma$/ml. of dihydrostreptomycin.

EXAMPLE III

Sample I was treated with an equivalent amount of stock solution C. The pH of the solution was adjusted to 6.5 and it was stirred for 36 hours at 25° C. The precipitate which formed was collected by filtration. It was washed with a 2% solution of 2,6-dibromo-4-nitrophenol. The precipitate was then assayed in accordance with the standard assay procedure and it was found to contain 100% of the streptidine originally present.

The following table is indicative of results obtained using the procedure in accordance with the description given above and specifically described in the preceding examples.

| Example | Stock Solution | Volume of Stock Solution, ml. | Sample | Volume of Sample, ml. | Time of Stirring, hrs. | pH | Streptidine Removed, percent |
| --- | --- | --- | --- | --- | --- | --- | --- |
| IV | A | 10 | I | 90 | 24 | 5.8 | 85 |
| V | B | 10 | II | 20 | 4 | 10.5 | 95 |
| VI | C | 10 | III | 10 | 36 | 7.5 | 100 |
| VII | D | 10 | I | 90 | 200 | 6.5 | 100 |
| VIII | A | 10 | II | 20 | 24 | 7.0 | 90 |
| IX | B | 10 | III | 10 | 36 | 7.5 | 95 |
| X | C | 10 | I | 90 | 48 | 6.8 | 98 |
| XI | D | 10 | II | 20 | 72 | 7.3 | 90 |
| XII | A | 10 | III | 10 | 36 | 6.7 | 100 |
| XIII | B | 10 | I | 90 | 48 | 6.5 | 90 |
| XIV | C | 10 | II | 20 | 100 | 7.1 | 95 |
| XV | D | 10 | III | 10 | 36 | 7.0 | 100 |

In carrying out the above examples, 10% solutions of the following alkaline reagents were used to adjust the pH; sodium hydroxide, sodium carbonate, potassium hydroxide and triethylamine.

EXAMPLE XVI

A mixture containing 2000 $\gamma$/ml. of streptidine and 400,000 $\gamma$/ml. of streptomycin was treated with a quantity of 2,6-dibromo-4-nitrophenol equivalent to the quantity of streptidine present and the pH of the mixture adjusted to 6.5 with triethylamine. The mixture was stirred at 70° C. for 20 hours and the resulting precipitate removed by filtration. It was shown to contain 70% of the streptidine originally present.

EXAMPLE XVII

A mixture containing 2000 γ/ml. of streptidine and 200,000 γ/ml. of dihydrostreptomycin was treated with a 1000% excess of 2,6-dichloro-4-nitrophenol (based on the amount of streptidine present) and the pH of the mixture adjusted to 5.8 with 5% aqueous sodium hydroxide. The mixture was stirred at 5° for 150 hours and the resulting precipitate removed by filtration. It was shown to contain 92% of the streptidine originally present.

What is claimed is:

1. A process for removing streptidine from aqueous solutions of streptomycin and dihydrostreptomycin which comprises adding to impure aqueous mixtures of these containing streptidine a 2,6-dihalogenated-4-nitrophenol at a pH of from 5.8 to about 10.5 and removing resulting precipitate.

2. A process as in claim 1 wherein the pH is from about 6.5 to about 7.5.

3. A process as in claim 1 wherein at least an equivalent quantity of precipitating reagent is added.

4. A process for removing streptidine from aqueous solutions of streptomycin and dihydrostreptomycin which comprises adding to impure aqueous mixtures of these containing streptidine at least an equivalent quantity of a 2,6-dihalogenated-4-nitrophenol at a pH of from about 5.8 to about 10.5, removing the resulting precipitate, adjusting the pH of the resulting filtrate to about 2.5, filtering and passing the resulting solution over an activated charcoal column at a pH of about 7.

No references cited.